2,864,707
Patented Dec. 16, 1958

2,864,707

BEVERAGE CONCENTRATES AND SYRUPS

Harry A. Toulmin, Jr., Dayton, Ohio, assignor, by mesne assignments, to Union Carbide Corporation, New York, N. Y., a corporation of New York No Drawing. Application January 16, 1956
Serial No. 559,103

13 Claims. (Cl. 99—166)

This invention relates to dry, solid comestibles, including beverage concentrates, in the form of free-flowing discrete particles having a thin protective coating or glaze of water-soluble dextran.

It often happens that powdered dehydrated foods and beverage concentrates adapted to be reconstituted with water or other liquid prior to being consumed, suffer a loss in potency, flavor, aroma and vitamin content, as for instance during shipping and storage.

The object of this invention is to provide improved dry, solid comestibles in the form of particles having a protective coating of dextran which prevents loss of potency, flavor, aroma, and volatile nutrition constituents from the particles during shipping and storage.

The incorporation of dextran or products comprising it has been suggested in the prior art for various purposes.

Thus, in the patent to William L. Owen, 2,602,082, a complex of dextran and an aldehyde is proposed as thickening agent, stabilizer, or emulsifying agent for food products of a foam, jelly or emulsion nature, including ice cream, cake icings and whipping cream. The patentee obtains dextran by inoculating a nutrient medium with a bacterium described as *Leuconostoc mesenteroides* (Cienkowski) van Tieghem. This strain of dextran-synthesizing bacteria dates back to the middle of the last century, when it was a taxonomic convention to indicate the name of the person (in this instance van Tieghem) responsible for placing an organism in a particular genus and species.

At the time of van Tieghem's work, and for many years thereafter, it was thought that "dextran" was a specific substance of constant chemical and physical properties. However, as is now known, the structure of a given dextran and the solubility characteristics thereof depend on the strain of microorganism used to produce it. It is not believed, by the experts, that any specific strain of microorganism can have its identity traced back to van Tieghem and, therefore, it is not believed possible to identify the strain used by him or the characteristics of the dextran he produced.

In the Owen patent (supra) it is stated that the dextran obtained using the microorganism designated therein as the van Tieghem strain yields aqueous solutions of low viscosity. The patentee proposes to increase the viscosity of the solutions by converting the dextran to a dextran-aldehyde complex. Those dextran-aldehyde complexes are said to be useful for thickening and emulsifying effect in foodstuffs which contain water. This use is given even though the evolution of formaldehyde from the complex is a distinct possibility.

The use of a syrup containing an undefined dextran for preventing sugar crystallization in foodstuffs is disclosed in the patent to Wadsworth et al., 2,409,816. The syrup consists of the sterilized fermentate obtained by inoculating a sucrose-containing nutrient medium with an unidentified strain of *Leuconostoc mesenteroides* and incubating the inoculated medium until the dextran is produced. The syrup, after sterilization to inactivate the microorganism, contains unconverted sucrose, dextrose, levulose, dextran and non-sugars which include the inganic salts of the nutrient medium.

The patent to Mahoney, 2,089,217, also recommends the incorporation of some unidentified dextran in comestibles such as candy of the fondant type and the aqueous sugar syrups used in the canning of fruits, for preventing crystallization of the sugar.

The present invention differs from the prior art as represented by the foregoing patents by taking advantage of an unobvious film-forming property of certain dextrans of specified molecular weight and chemical structure, i. e., the ratio of 1,6 to non-1,6 linkages, to provide particles of dry, solid comestibles with a protective dextran film or coating which seals them against loss of potency, flavor, aroma, and volatile nutritive constituents, and insures that the particles remain in discrete, free-flowing condition until they are reconstituted by means of water or other liquid such as milk to produce a beverage, a dessert such as a gelatin dessert, soup, and so on.

The dextran used in practicing the invention is a water-soluble dextran having a molecular weight between about 20,000 and at least one million, as determined by light-scattering measurements, and in which 60% to 97% of the linkages joining the anhydroglucose units are 1,6 linkages. Preferred dextrans have a molecular weight of 20,000 to 200,000 (average 60,000 to 80,000), and a 1,6 to non-1,6 linkages ratio of 10:1 to 22:1.

The native dextran is obtained by inoculating a suitable nutrient medium such as one having the composition:

| | Percent by weight |
|---|---|
| Sucrose | 20 |
| Corn steep liquor | 2 |
| Monobasic potassium phosphate | 0.5 |
| Manganous sulfate | 0.002 |
| Sodium chloride | 0.5 |
| Water | Balance | with a culture of an NRRL (Northern Regional Research Laboratories) strain of bacteria of the *Leuconostoc mesenteroides* or *L. dextranicum* types and incubating the mass until the dextran is produced in maximum yield. The enzyme of the microorganism may be filtered from the culture thereof and inoculated into the nutrient medium, in which case the biosynthesis of the dextran proceeds in the substantial absence of bacteria and bacterial debris. The dextran is precipitated from the fermentate by means of a water-miscible aliphatic alcohol or ketone, and purified.

The strain of bacteria used to convert the sucrose to dextran is one yielding a dextran having a molecular weight and 1,6 to non-1,6 linkages ratio within the limits stated herein.

The strains which may be used to obtain the desired dextran include those bearing the following NRRL designations: *Leuconostoc mesenteroides* B–119, B–1146, B–1190, B–742, B–1191, B–1196, B–1208, B–1216, B–1120, B–1144, B–523; *Streptobacterium dextranicum* B–1254 and *Betabacterium vermiforme* B–1139.

The dextran produced in the fermentate by these various strains is known as "native" dextran. It has a molecular weight of at least a million and usually the molecular weight is estimated at many millions. When this native dextran is water-soluble, as when the strains B–512, B–1146 and B–1190 mentioned above are used, the native dextran, after purification, may be used for the present purposes.

However, water-insoluble or difficultly water-soluble dextrans obtained using certain other strains, such as the strains *L. m.* B–742, B–1191, B–1196, B–1208, B–1216, B–1120, B–1144 and B–523 mentioned above, may be hydrolyzed to a molecular weight at which they form colloidal solutions in water, usually to molecular weight between 20,000 and about 500,000, and used in the present practice. Hydrolysates of the inherently water-soluble native dextrans having a molecular weight between that of the native dextran and about 20,000 may also be used. The hydrolysis may be effected by means of acid or enzymatically.

Any modification of the method described resulting in the direct production of the dextran having molecular weight and 1,6 to non-1,6 linkages ratio in the ranges stated may be used to obtain the dextran, such as the known process involving the addition of the enzyme, dextransucrase, to the nutrient medium and resulting in the direct production in the fermentate of dextran having a molecular weight of 20,000 to 200,000.

In one embodiment of the invention, the product is a particulate beverage concentrate comprising a plant essence, for example, tea, coffee, or cocoa. These dry concentrates may be obtained by extracting the essence from the plant part or suitable raw material with an appropriate solvent, removing the solvent eventually by spray drying to obtain a fine powder, distributing the particles on a supporting surface, subjecting them to a fine mist comprising 0.1 to 1.0% of the dextran in water or alcohol and then drying them to obtain discrete particles of the concentrate encased in a very thin coating of the dextran. In another modification, the extract may be substantially completely dehydrated in vacuo, granulated, and the granules may be sprayed with the dilute dextran solution through a spray head providing a fine mist.

The powder or granules may be stirred or shaken on the support during spraying thereof with the dextran solution to insure wetting of all portions of the surfaces of the particles with the coating solution.

In another embodiment, the extract from which the bulk of the extracting solvent has been removed may be spray-dried and during the spraying subjected to a mist of an aqueous or alcoholic dextran solution (0.1–1.0%) so that the dextran is precipitated on the particles of the concentrate coincidentally with removal of the residual solvent from the concentrate.

It is also within the scope of the invention to drum dry the extract and to spray both sides of the sheet thus obtained with the aqueous or alcoholic dextran solution followed by drying of the sheet and reduction thereof to particulate condition.

Any method that insures a thin protective dextran coating on the particles may be used in practicing the invention.

Milk powder may be prepared under conditions as described to provide the particles with the dextran coating. Dehydrated foodstuffs of various kinds are within the scope of the invention, also. Thus, 0.1 to 1.0% of dextran may be incorporated in a vegetable soup, prior to or during the course of dehydration thereof, to provide the vegetable fragments with a protective coating thereof.

The following examples are given to illustrate specific embodiments of the invention it being understood that these examples are not intended as limitative.

*Example I*

Two pounds of finely ground, roasted coffee are treated in a silex coffee-making apparatus to produce a strong coffee extract. The extract is evaporated at 29 inches mercury vacuum in a Pfaudler glass-lined evaporator to remove 80% of the water. The concentrated extract is then spray-dried onto a supporting surface equipped to be continuously shaken. An 0.5% alcoholic solution of hydrolyzed L. m. B-512 dextran (molecular weight average 60,000–80,000; 95% 1,6 type linkages) is sprayed on the particles in the form of a fine mist while they are shaken continuously to expose all surfaces thereof to the mist. The tray or other support carrying the coated particles is then passed through a heating zone in which the particles are dried with shaking of the tray to prevent adhesion of the particles while the solvent is being removed.

*Example II*

A pound of tea leaves is steeped in 300 cc. of boiling water for 20 minutes to obtain a highly potent tea. The liquid is pressed out, 80% of the water is evaporated off under vacuum, the concentrated extract is spray dried and the resulting particles are provided with a dextran coating as in Example I, except that an aqueous (0.5%) solution of native B-512 dextran is used. The spraying is performed at room temperature, at which there is no substantial dissolution of the concentrate particles.

*Example III*

Two pounds of Theobroma cacao seeds are treated in the usual way to express the fat therefrom. The reddish-brown particulate residue is sprayed with an alcohol (0.5%) solution of hydrolyzed L. m. B-1146 dextran (molecular weight about 300,000; 97% of linkages 1,6 type) as in Example I to provide a cocoa the particles of which are protected by the dextran and which may be dispersed in milk.

*Example IV*

Powders obtained as in Examples I, II, and III are sprayed with an 0.5% aqueous or alcoholic solution of
(a) Hydrolyzed L. m. B-1412 dextran, (molecular weight 60,000–80,000; 95% of linkages 1,6 type; alcohol solution).
(b) Hydrolyzed L. m. B-512 dextran (molecular weight about 500,000, 95% of linkages of 1,6 type, alcohol solution).
(c) Hydrolyzed L. m. B-523 dextran (molecular weight 20,000 to 50,000; 66% of linkages of 1,6 type; alcohol solution).
(d) Native L. m. B-512 dextran (aqueous solution).

*Example V*

A vegetable soup is prepared and then evaporated to dryness in the usual way. Before or during the dehydration, 1.0% of dextran (native, unhydrolyzed B-512) is added. In the resulting product, the dehydrated vegetables and particles of essence are protected by a thin glaze of the dextran. On simmering in water, the vegetables "plump up" to provide a palatable soup having the aroma and flavor of the original soup.

Other particulate dried comestibles may be prepared having the protective coating of water-soluble dextran of the stated molecular weight (20,000 to at least a million) and in which 60% to 97%, specifically 95% to 97% of the linkages joining the anhydroglucose units are 1,6 linkages. Since other comestibles may be substituted for those shown in the examples, and other dextrans meeting the stated requirements may be used for those shown as representative, without departing from the invention, it is to be understood that it is not intended to limit the invention except as it is defined in the appended claims.

What is claimed is:

1. A dry, solid, particulate comestible the particles of which are provided with a thin, firmly adherent, protective coating of water-soluble dextran having a molecular weight between 20,000 and that of native, unhydrolyzed microbiologically produced dextran and in which 95% to 97% of the linkages joining the anhydroglucose units are 1,6 linkages.

2. A dry, solid, particulate comestible the particles of which are provided with a thin, firmly adherent, protective coating of water-soluble hydrolyzed dextran having a molecular weight of 20,000 to 500,000 and in which 95% to 97% of the linkages joining the anhydroglucose units are 1,6 linkages.

3. A dry, solid, particulate comestible the particles of which are provided with a thin, firmly adherent, protective coating of water-soluble native dextran in which 95% to 97% of the linkages joining the anhydroglucose units are 1,6 linkages.

4. A dry, solid, particulate comestible the particles of which are provided with a thin, firmly adherent, protective coating of water-soluble hydrolyzed dextran having a molecular weight of 60,000 to 80,000 and in which 95% to 97% of the linkages joining the anhydroglucose units are 1,6 linkages.

5. A coffee concentrate in particulate form and the particles of which have a thin, firmly adherent, protective coating of water-soluble dextran having a molecular weight between 20,000 and that of native, unhydrolyzed microbiologically produced dextran and in which 95% to 97% of the linkages joining the anhydroglucose units are 1,6 linkages.

6. A coffee concentrate in particulate form and the particles of which have a thin, firmly adherent, protective coating of water-soluble native dextran in which 95% to 97% of the linkages joining the anhydroglucose units are 1,6 linkages.

7. A tea concentrate in particulate form and the particles of which have a thin, firmly adherent, protective coating of water-soluble dextran having a molecular weight between 20,000 and that of native, unhydrolyzed microbiologically produced dextran and in which 95% to 97% of the linkages joining the anhydroglucose units are 1,6 linkages.

8. A tea concentrate in particulate form and the particles of which have a thin, firmly adherent, protective coating of water-soluble native dextran in which 95% to 97% of the linkages joining the anhydroglucose units are 1,6 linkages.

9. A dry milk powder the particles of which have a thin, firmly adherent, protective coating of water-soluble dextran having a molecular weight between 20,000 and that of native, unhydrolyzed microbiologically produced dextran and in which 95% to 97% of the linkages joining the anhydroglucose units are 1,6 linkages.

10. A dry milk powder the particles of which have a thin, firmly adherent, protective coating of a water-soluble dextran having a molecular weight between 20,000 and 500,000 and in which 95% to 97% of the linkages joining the anhydroglucose units are 1,6 linkages.

11. A dry milk powder the particles of which have a thin, firmly adherent, protective coating of a water-soluble native dextran in which 95% to 97% of the linkages joining the anhydroglucose units are 1,6 linkages.

12. A dehydrated vegetable soup comprising vegetable fragments having a thin protective coating of a water-soluble dextran of a molecular weight between 20,000 and that of native, unhydrolyzed microbiologically produced dextran and in which 95% to 97% of the linkages joining the anhydroglucose units are 1,6 linkages.

13. A dehydrated vegetable soup comprising vegetable fragments having a thin, firmly adhering protective coating of a water-soluble native dextran in which 95% to 97% of the linkages joining the anhydroglucose units are 1,6 linkages.

References Cited in the file of this patent

UNITED STATES PATENTS

| | | |
|---|---|---|
| 20,848 | Stowman | Mar. 26, 1878 |
| 1,002,137 | Carreras | Aug. 29, 1911 |
| 1,202,130 | Vasey | Oct. 24, 1916 |
| 2,089,217 | Mahoney | Aug. 10, 1937 |
| 2,183,173 | Segura | Dec. 12, 1939 |
| 2,409,816 | Wadsworth | Oct. 22, 1946 |
| 2,518,135 | Gaver | Aug. 8, 1950 |
| 2,602,082 | Owen | July 1, 1952 |
| 2,665,992 | Naps | Jan. 12, 1954 |
| 2,734,828 | Toulmin | Feb. 14, 1956 |

FOREIGN PATENTS

| | | |
|---|---|---|
| 517,820 | Great Britain | Feb. 9, 1940 |

OTHER REFERENCES

"Advances In Carbohydrate Chemistry," vol. 14, 1949, by Pigman and Wolfrom, page 333.